United States Patent [19]

Wu

[11] Patent Number: 4,935,047
[45] Date of Patent: Jun. 19, 1990

[54] STEERING WHEEL LOCK
[75] Inventor: Jinn F. Wu, Tainan, Taiwan
[73] Assignees: James E. Winner, Jr.; Donna C. Winner, both of Sharon, Pa.
[21] Appl. No.: 287,105
[22] Filed: Dec. 20, 1988
[51] Int. Cl.5 .............................................. B60R 25/02
[52] U.S. Cl. ........................................ 70/209; 70/238
[58] Field of Search .................................. 70/209–211, 70/215, 225, 226, 252

[56] References Cited

U.S. PATENT DOCUMENTS

| D. 289,491 | 4/1987 | Johnson | D8/330 |
|---|---|---|---|
| 1,268,137 | 6/1918 | Mailloux | 292/147 |
| 1,347,463 | 7/1920 | Jameson | 70/209 |
| 1,364,539 | 1/1921 | Baker | 70/199 |
| 1,448,658 | 3/1923 | Furber | 70/209 X |
| 2,528,746 | 11/1950 | Giffin | 70/181 X |
| 3,245,239 | 4/1966 | Zaidener | 70/202 |
| 3,462,982 | 8/1969 | Moore . | |
| 3,664,164 | 5/1972 | Zaidener | 70/202 |
| 3,742,743 | 7/1973 | Stoyanovitch | 70/209 |
| 3,807,779 | 4/1974 | Enders | 292/147 |
| 3,815,391 | 6/1974 | Latta | 70/209 |
| 4,103,524 | 8/1978 | Mitchell | 70/209 |
| 4,175,410 | 11/1979 | Schwaiger | 70/226 |
| 4,304,110 | 12/1981 | Fain | 70/209 |
| 4,738,127 | 4/1988 | Johnson | 70/209 |
| 4,747,279 | 5/1988 | Solow | 70/238 |
| 4,750,341 | 6/1988 | Laguna | 70/209 |
| 4,768,359 | 9/1988 | Wade | 70/14 |
| 4,823,573 | 4/1989 | Latta | 70/209 |
| 4,829,797 | 5/1989 | Wu | 70/209 |
| 4,848,110 | 7/1989 | Kuo | 70/238 |
| 4,856,308 | 8/1989 | Johnson . | |

FOREIGN PATENT DOCUMENTS

| 402771 | 4/1970 | Australia . | |
|---|---|---|---|
| 106072 | 12/1966 | Denmark . | |
| 2718291 | 10/1978 | Fed. Rep. of Germany | 70/211 |
| 1127524 | 9/1968 | United Kingdom | 70/209 |
| 1554593 | 10/1979 | United Kingdom | 70/238 X |
| 2024307 | 1/1980 | United Kingdom . | |
| 2039840 | 8/1980 | United Kingdom . | |

OTHER PUBLICATIONS

Information Disclosure Statement filed by Applicant in prosecution of application Ser. No. 112,375 Filed 10/26/87, with attachments.
Protest under 37 C.F.R. 1.291(a) against issuance of patent, filed against Applicant's prior Application Ser. No. 015,596, filed 2/17/87, as explained in item AR above, with attachments.
Advertisement from Daily News Classified 6/28/84.
Royce Union "Anti-Theft Steering Wheel & Brake Pedal Lok" #A23105 and Royce Union Security Product #A23204, no date shown.
J. C. Whitney & Co. Catalog. ©1982, Catalog 430B, p. 83 "Heavy Duty Steering Wheel & Brake Lock" 81-0336P, 1983.
Allison Catalog p. 70 Anti-Theft Devices: "Crook Hook" 1983 #8370.
Exhibit "A"-New Items From Wolo Numbered pp. 00066-00067.
Exhibit "B"-Do-It-Yourself Automotive Products Numbered pp. 00052-00059.
Exhibit "C"-Automotive Security Products Numbered pp. 00001-00028.
Exhibit "D"-Automotive Security Products Numbered pp. 00060-00065.
Exhibit "E"-Automotive Security Products Numbered pp. 00029-00051.
Advertisement for "The Club".

Primary Examiner—Robert L. Wolfe
Assistant Examiner—Suzanne L. Dino
Attorney, Agent, or Firm—Body, Vickers & Daniels

[57] ABSTRACT

A motor vechicle steering wheel lock for mounting diametrically across the rim of the steering wheel and having an extended portion adapted to block complete rotation of the steering wheel has locking means which simplify and reduce the number of manual manipulation required to mount and remove the steering wheel lock. A locking means is provided to permit only axial extension of the elongated steering wheel lock when in the locked condition, and to permit axial contraction of the elongated steering wheel lock only when in the unlocked condition.

4 Claims, 5 Drawing Sheets

STEERING WHEEL LOCK

The present invention pertains to the art of motor vehicle anti-theft devices, and particularly to an anti-theft device for attachment to the steering wheel of a motor vehicle to prevent complete rotation thereof and thereby to prevent unauthorized operation of the vehicle.

Background of the Invention

Anti-theft devices for motor vehicles comprise several different types. These include alarms or other electronic devices which disable the vehicle unless bypassed by an authorized operator with a special key or electronic code, but those devices suffer from the disadvantages of being expensive and prone to malfunction. Furthermore, alarms and electronic anti-theft devices are commonly arranged beneath the hood of the vehicle where a knowledgeable criminal may easily locate and disconnect them.

Another type of anti-theft device is one which restrains relative movement between the operating controls at the interior of the vehicle in order to prevent the vehicle from being driven. This type of device comprises a pair of hooks at opposite ends of an elongated locking apparatus which is adjustable in length. One hook is engaged on a foot pedal and the other is positioned around the steering wheel rim. The elongated apparatus is then contracted in length and locked into position to provide a rigid and tight connection between the foot pedal and the steering wheel whereby neither of those vehicle control components can be moved relative to the other. Such connecting type antitheft devices suffer from the serious disadvantage of being inconvenient and difficult for most consumers and motorists to use. Installation cannot be easily accomplished while sitting behind the wheel, as one must reach down to the foot pedals to manipulate the lower hook into position, and must first extend the other hook upwardly beyond the steering wheel in the direction where one would ordinarily be seated before that hook can be contracted back downwardly into engagement with the steering wheel rim. These manipulations of the anti-theft device would best been carried out from the exterior of the vehicle with the door open, but that approach suffers from obvious disadvantages in terms of adverse weather conditions, available space and parking locations, and simple preference for convenience. Furthermore, the lock on a device of that type is located inconveniently out of reach beneath the steering wheel.

A third and more successful type of vehicle anti-theft device is one which is mounted solely on the steering wheel to prevent the wheel from being turned. This type of anti-theft device usually comprises a metal bar mounted diametrically across the steering wheel and having an elongated projection at one end extending substantially beyond the rim of the steering wheel to come in contact with the vehicle interior and thereby to prevent complete rotation of the steering wheel when the wheel is turned. The steering wheel lock type of anti-theft devices are installed and operate independently of other interior vehicle control components, and thus overcome the disadvantages associated with the aforementioned connecting type of anti-theft device. However, known steering wheel locks do suffer from several disadvantages associated with mounting of the metal bar across the steering wheel rim. For example, U.S. Pat. No. 4,103,524 to Mitchell et al shows a pair of hooks for mounting the elongated bar on the steering wheel rim, but is limited in its application to rims having a diameter corresponding to the fixed hook spacing. This problem is overcome by the steering wheel lock shown in U.S. Pat. No. 4,304,110 to Fain, wherein the mounting hooks are provided on separate rod members with the spacing therebetween being adjustable by means of a threaded connection between the separate rod members. This is an improvement over the arrangement in the Mitchell patent, but is not entirely convenient and easy to use as it would be somewhat time consuming to make the required adjustments. It is known to provide the steering wheel rim hooks on separate elongated members which are telescopically axially shiftable with respect to each other and which may be locked at a number of spaced axial positions, as shown in British Patent Application No. GB 2039840A. However, that device requires the two telescopic members manually be held in position to align apertures extending therethrough such that a pad lock shaft can be inserted through the apertures to lock those members in the desired axial position. The user must inconveniently manipulate the pad lock with one hand while holding the telescopic members with the other.

The adjustment and handling problems associated with the aforementioned steering wheel lock are substantially overcome by the device shown in U.S. Pat. No. 4,738,127 to Johnson, assigned to the present assignee. One rim hook of that steering wheel lock is provided on an elongated tubular member, and the other rim hook is provided on an elongated rod member telescopically receivable in the tubular member. The rod member has a series of circumferentially extending grooves closely spaced along its length. A lock housing is provided where the rod member is received in the tubular member and includes a spring biased retainer at a fixed axial position. The retainer is spring biased into engagement with the particular rod groove at that axial location to loosely hold the rod member steady in the tubular member. The housing also includes a key lock cylinder which turns a torque blade into engagement with the retained rod groove to securely lock the rod in that axial position. The closely spaced rod grooves advantageously define a great number of positions at which the rim hooks may be spaced apart, and the retainer advantageously holds the spaced hooks at the desired position to free the user's hands for attention to the key and lock.

The prior patented steering wheel lock of the present assignee successfully overcomes the disadvantages in adjustment and handling discussed above with respect to the previously known steering wheel locks, but still is not ideally convenient and easy to use. Although the retainer conveniently holds the hooks in the desired spaced location on the steering wheel rim, the user must use a key to lock the telescopic members in that position. Use of the key is again required when the steering wheel lock is to be removed. Each use of the steering wheel lock between operations of the motor vehicle thus requires two operations with the key lock. Since speed and convenience are strict requirements of most motorists, and since one usually operates an automobile several times daily, these repeated operations with a key in addition to those normally required to enter and operate an automobile could be prohibitively cumbersome whereby a motorist may frequently neglect to use the steering wheel lock and may ultimately abandon it.

A steering wheel lock shown in U.S. Pat. No. 3,462,982 to Moore has one wheel rim hook carried on a lock member which is slidable along a ratchet bar. The lock member is slidable on the ratchet bar only in a radially outward direction unless an associated key lock is unlocked. The ratchet mechanism obviates the need for a manual key operation to secure the slidable rim hook in its radially outward position mounted on the steering wheel rim. Reduction in the frequency of key use is a relative advantage of the steering wheel lock shown by Moore, but that device suffers from several other disadvantages which render it highly impractical as an anti-theft device to be used on a daily basis by typical consumers and motorists. Exposure of the ratchet bar and connecting elements between the ratchet bar and the body of the steering wheel lock present numerous sharp edges and pinch points where a user's fingers could easily become injured during manipulation of the device. The same structural features present pry points in which a criminal could easily inset and wield a crowbar to destroy and remove the device. Even if the exposed parts could withstand application of a crowbar, they present the appearance of being susceptible to forcible removal. The appearance of the device would not discourage a potential thief and could not prevent the damage associated with unauthorized entry into the vehicle preliminary to the attempt to remove the steering wheel lock. An additional disadvantage of a steering wheel lock of the type shown by Moore is that the elongated body member, as well as the exposed ratchet bar, are formed of flat bar stock. The rectangular cross-section of these members does not allow for relative rotation of the rim hooks about the axis of the elongated body member. In use, the preferred orientation of an installed steering wheel lock would be horizontally across the front of the steering wheel, and rotation of the hooks relative to one another may often be desirable to mount the hooks around wheel spokes which may join the rim at the horizontally opposed locations.

The prior art is thus seen to fail to provide a steering wheel lock which is easily and conveniently mounted on a steering wheel with a minimum of manual manipulation and which securely and effectively discourages theft of the vehicle.

Summary of the Invention

In accordance with a principal feature of the invention there is provided a steering wheel lock comprised of an elongated sleeve member having an axis, first and second ends, and a first wheel rim hook intermediate the ends to engage the rim of the steering wheel from the inside. A projected portion of the sleeve member extends past the first rim hook and beyond the steering wheel rim to block complete rotation of the wheel. An elongated shaft member is telescopically receivable in the sleeve member, and has a second wheel rim hook facing oppositely to the first wheel rim hook to engage the opposite rim of the steering wheel from the inside. Locking means are provided to permit telescopic movement of the shaft member only out of the sleeve member when locked, and to permit telescopic movement of the shaft member into the sleeve member only when unlocked. The steering wheel lock can be mounted on a steering wheel by placing the first rim hook on the wheel rim, and then by withdrawing the shaft member out of the sleeve member until the second rim hook moves across the wheel into firm engagement with the opposite side of the rim. At that point the locking means will hold the looks in the axially spaced locked position until unlocked to permit movement of the shaft member back into the sleeve member with consequent withdrawal of the second hook off of the wheel rim. The locking means advantageously eliminates the need for a manual key operation to hold the hooks in the mounted position.

In accordance with a more specific feature of the invention, the shaft and sleeve members are formed as a rod and tube with circular cross-sections to permit relative rotation of the hooks with respect to each other. This facilitates placement around spokes which may join the rim at horizontally opposed locations where the hooks would preferably be mounted.

In accordance with another specific feature of the invention, the locking means comprises a series of longitudinally adjacent ratchet teeth on the rod member, the ratchet teeth having conical bearing surfaces extending radially outwardly in a direction axially away from the second rim hook on the tubular member, and annular stop surfaces perpendicular to the axis thereof. The locking means further comprises a lock housing mounted on the first end of the tubular member, the lock horsing having an axial passageway extending therethrough to telescopically receive the rod member. Disposed within the lock housing is a ratchet pawl, and a spring to bias the pawl into engagement with the teeth on the rod member when the rod member is received in the passageway extending through the lock housing. Also disposed within the lock housing is a key lock means adapted to withdraw the ratchet pawl out of engagement with the ratchet teeth against the spring. Positioning of the locking components within the lock housing and engagement thereof with the rod member ratchet teeth within the lock housing passageway safely keeps these components out of contact with the user's fingers, and importantly keeps them out of reach of a destructive criminal tool.

In accordance with another principal feature of the invention, there is provided a method of securing a motor vehicle against theft. The method includes the step of providing an elongated steering wheel lock having an axis and first and second hooks, with the hooks opening oppositely along the axis and being adapted to engage the rim of a steering wheel from the inside. Also provided are means for shifting the second hook between a plurality of positions axially spaced from the first hook, and locking means having a locked condition wherein the second hook is permitted only to shift axially away from the first hook and an unlocked condition permitting the second hook to shift axially toward the first hook. The method further includes the steps of placing the locking means in the locked condition, placing the first hook on the steering wheel rim, and shifting the second hook axially away from the first hook into engagement with the steering wheel rim at a position opposite the first hook. The invention thus simplifies the process of mounting a steering wheel lock on the wheel rim by eliminating the need for a manual locking operation at the mounted position. The locking means may be placed in the locked condition when the steering wheel lock is put in storage after removal from the wheel. The steering wheel lock is thereafter mounted merely by placing the first hook onto the wheel rim and by sliding the second hook across the wheel into position on the opposite side of the rim where it is self-locked without the use of a key.

In accordance with a more specific feature of the invention, the method further includes the step of providing means to rotate the second hook about the axis with respect to the first hook, whereby the hooks can be mounted around steering wheel spokes. The invention thus advantageously enables the steering wheel lock to be mounted in the preferred position extending horizontally across the wheel in front of the seated user even when a wheel spoke is positioned where a hook would be placed, such as when the vehicle is parked with the steering wheel turned to point the wheels to the side, against the curb on a hill, etc. This feature of the invention also enables the steering wheel lock to be mounted on the wheel without interfering with or contacting the horn mounted thereon.

The principal object of the present invention is to provide a vehicle steering wheel lock which is easy and convenient to use and to mount onto a steering wheel.

Another object of the invention is to provide a steering wheel lock of the type having oppositely disposed wheel rim hooks and a projecting portion adapted to block rotation of the steering wheel, which steering wheel lock is mountable and removable from the steering wheel with a minimum amount of manual manipulation of a key and lock.

A further object of the invention is to provide a steering wheel lock which is mountable on a steering wheel by placing a first elongated member with a wheel rim hook into engagement with the steering wheel rim at one side thereof, and by extending a second elongated member having a wheel rim hook telescopically out of the first elongated member across the steering wheel into engagement with the steering wheel rim at a position wherein a locking means will retain the elongated members without the use of a manual key locking operation.

An additional object of the invention is to provide a steering wheel lock comprised of two telescopically axially shiftable elongated members each having a wheel rim hook which is rotatable about the axis with respect to the other to facilitate placement thereof about the spokes of a steering wheel, and which is self locking in an axially extended position.

Another object of the invention is to provide a steering wheel lock wherein the locking components are totally enclosed and protected from application of a crowbar or other destructive criminal tool.

Yet another object of the invention is to provide a method of locking a vehicle steering wheel which requires a minimum of manual manipulations.

These and other objects of the invention will become apparent from the following description of a preferred embodiment thereof taken together with the accompanying drawings.

Detailed Description of a Preferred Embodiment

Figure 1:
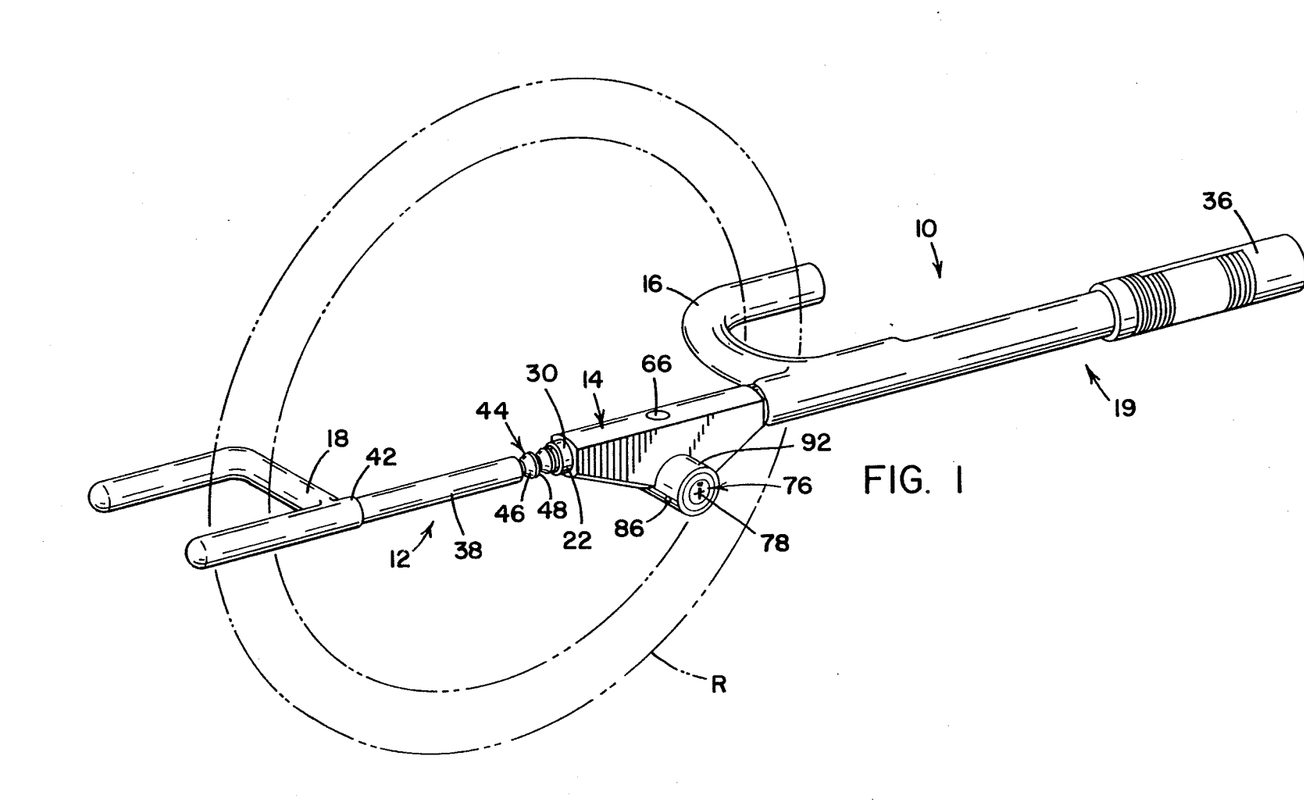
FIG. 1 is a perspective view of a steering wheel lock in accordance with the present invention, shown in a position taken when mounted on a steering wheel.
Figure 2:
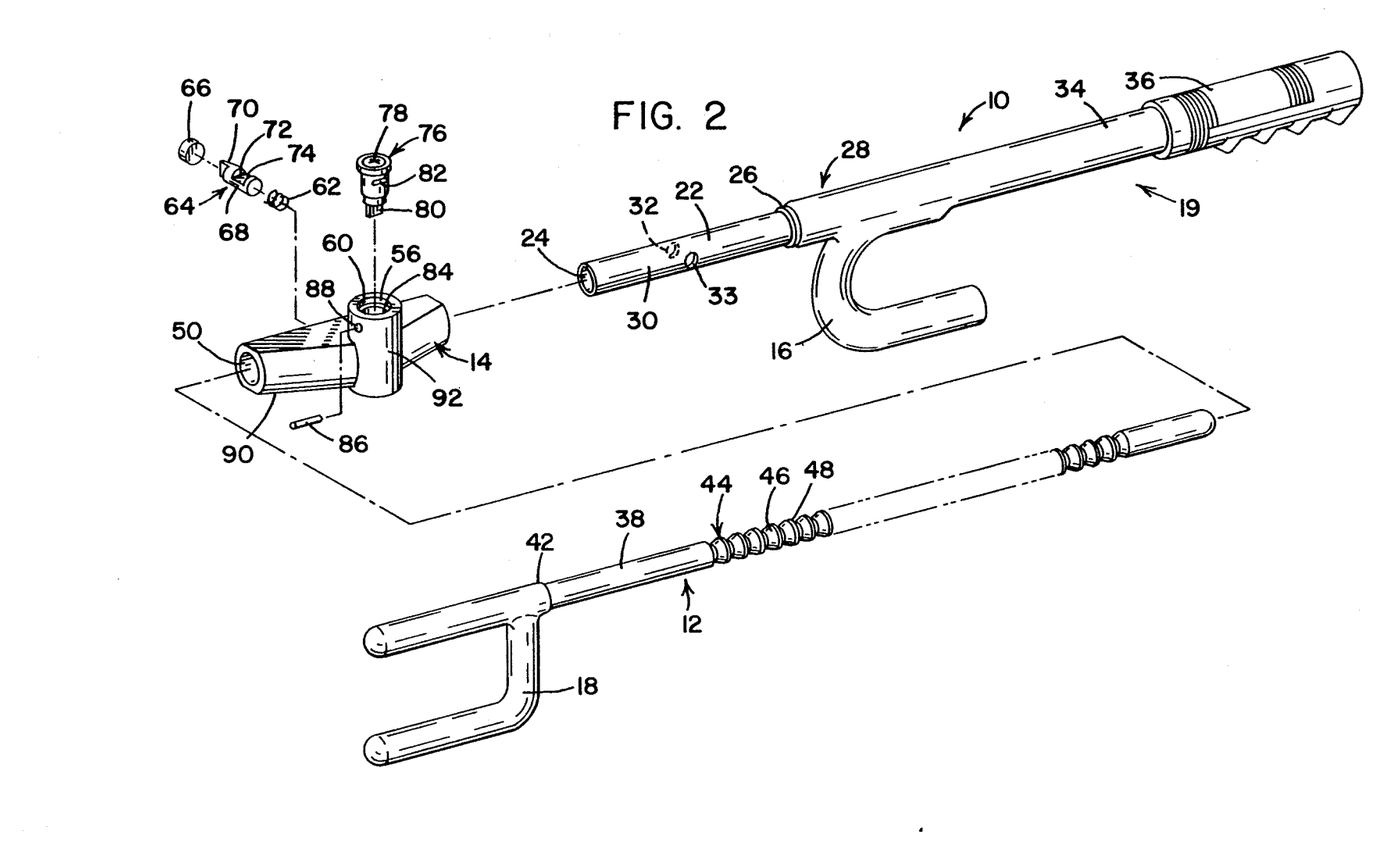
FIG. 2 is an exploded view, shown in perspective, of the steering wheel lock of FIG. 1.

Referring now to the drawings wherein the showings are for the purpose of illustrating a preferred embodiment of the invention only and not for the purpose of limiting same, in FIG. 1 there is shown an exploded view of a steering wheel lock according to the present invention. Broadly stated, the steering wheel lock is comprised of an elongated tubular member 10, an elongated rod member 12 which is telescopically received within the tubular member 10, and a lock housing 14. Wheel rim hooks 16 and 18 for engaging opposed portions of the steering wheel from the inside thereof are provided on the tubular member 10 and the rod member 12, respectively. The lock housing 14 includes means to position and lock the rod member 12 stationary with respect to the tubular member 10 at any one of a plurality of axially spaced positions. The tubular member 10 includes a projected portion 19 extending beyond the first rim hook 16 sufficiently to come into contact with the vehicle interior when the steering wheel is turned and thereby to block complete rotation of the wheel.

Figure 6:
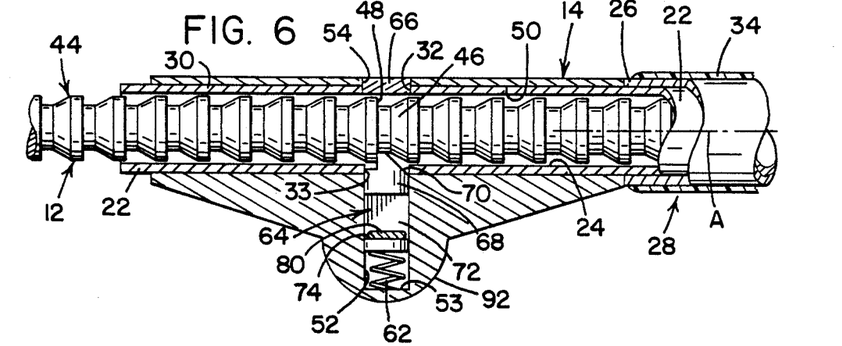
FIG. 6 is an enlarged sectional view taken along line 5—6 of FIG. 4.

More specifically, the elongated tubular member 10 is comprised of an elongated tube 22 of circular cross-section about an axis A. The tube 22 defines a central passage 24 of circular cross-section concentric about the axis A, and is surrounded by an outer sleeve 26 to provide a double walled section 28 as shown in FIG. 6. A portion 30 of the tube 22 extends axially beyond the end of the double walled section 28 and includes a pair of aligned apertures 32, 33. The first wheel rim hook 16 has a generally U-shape opening in the axial direction away from the extended portion 30 of the tubular member 10, and is rigidly secured to the tubular member 10 at the outer sleeve 26 of the double walled section 28. The tube 22 and the outer sleeve 26 are preferred to be comprised of lengths of standard structural steel pipe welded together. The first wheel rim hook 16 is also preferred as a standard structural steel pipe bent or otherwise formed into the U-shaped configuration and welded to the outer sleeve 26. A durable plastic coating 34 is provided over the outer sleeve 26 and the first wheel rim hook 16 to provide a nonabrasive surface over the tubular member 10. A handle grip 36 is provided at the end of the tubular member 10.

The elongated rod member 12 is comprised of an elongated rod 38 of circular cross-section. The outer diameter of the rod 38 is dimensioned slightly less than the diameter of the passage 24 in the tubular member 10 to enable the rod 38 to move freely in telescopic fashion in the tubular member 10. A generally L-shaped member 40 shown in phantom view in the figures is rigidly secured to the end of the rod 38 to form the second wheel rim hook 18 which opens oppositely to the first wheel rim hook 16 for engagement with an opposed portion of the steering wheel. A second durable plastic coating 42 is provided over the second wheel rim hook 18. A plurality of ratchet teeth 44 are provided in an axially spaced longitudinal series along the rod 38. The ratchet teeth 44 each comprise a conical surface 46 extending radially outwardly in an axial direction away from the second wheel rim hook 18, and an annular stop surface 48 extending perpendicularly to the axis A. The rod 38 and the generally L-shaped member 40 are preferred to be formed of case hardened steel.

The lock housing 14 comprises a lock passageway 50 of circular cross-section and having a diameter corresponding to the outside diameter of the extended portion 30 of the tube 22 so that the lock housing 14 is telescopically receivable over the extended portion 30 to be mounted thereon. The lock housing 14 includes a first bore 52 extending perpendicularly to the axis A and having a closed inner end 53 and an open outer end 54. The first bore 52 crosses the lock passageway 50 and is aligned with the apertures 32, 33 in the extended portion 30 of the outer sleeve 26. The lock housing 14 further comprises a second bore 56 having an inner end 58 opening on the first bore 52 and an open outer end 60. The locking means disposed within the lock housing 14 includes a coil spring 62 acting in an axial direction at the closed inner end 53 of the first bore 52, and a ratchet pawl 64 received in the first bore 52 to extend from the coil spring 62 through the aperture 33 into the central passage 24 of the elongated tube 22. The open outer end 54 of the bore 52 is closed as by a plug 66. The ratchet pawl 64 comprises a shaft 68 having an angular end surface 70, a recess 72, and a torque blade surface 74 within the recess 72. The locking means further comprises a key lock cylinder 76 having a keyhole 78, a torque blade 80, and a slot 82. The lock cylinder 76 is received within the second bore 52 against the bore shoulder 84 and is secured therewithin by means of a locking pin 86 received through a pin hole 88 into the slot 82. The torque blade 80 extends into the recess 72 in the ratchet pawl 64 to register with and cooperate with the torque blade surface 74 in a manner to be described below.

Figure 3:
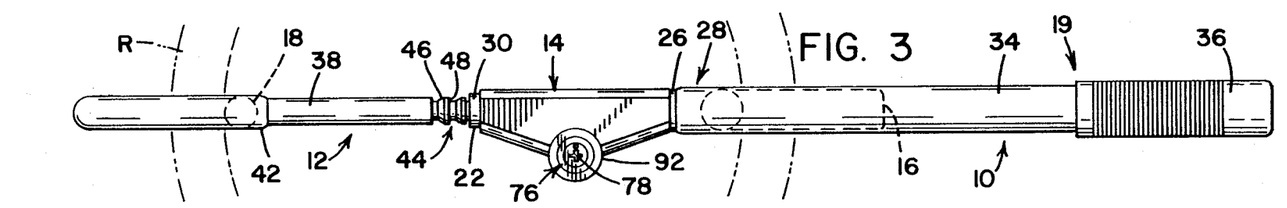
FIG. 3 is a front view of the steering wheel lock of FIG. 1.

As set forth above, the elongated tube 22 and the outer sleeve 26 of the tubular member 10 are comprised of lengths of standard steel pipe. In accordance with the preferred embodiment of the present invention, the lock housing 14 is comprised of steel and is die cast around the extended portion 30 of the tube 22 to form an integral structure therewith. The first bore 50 is machined or otherwise formed after the lock housing 14 is formed onto the extended portion 30 of the tube 22, whereby the first bore 50 and the apertures 32, 33 are formed simultaneously to assure alignment thereof. The apertures 32, 33 are shown separately in FIG. 3 only for the purpose of structural illustration. The closed structure of the lock housing 14 formed over the end of the tubular member 10 protects the enclosed locking components from tampering, as the only access thereto is axially inwardly through the open end of the passageway 50. That access is blocked by presence of the rod member 12.

Figure 4:
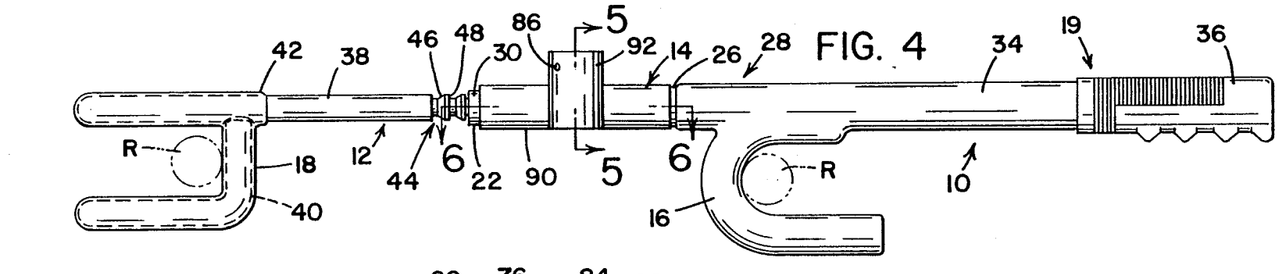
FIG. 4 is a bottom view of the steering wheel lock of FIG. 1.
Figure 5:
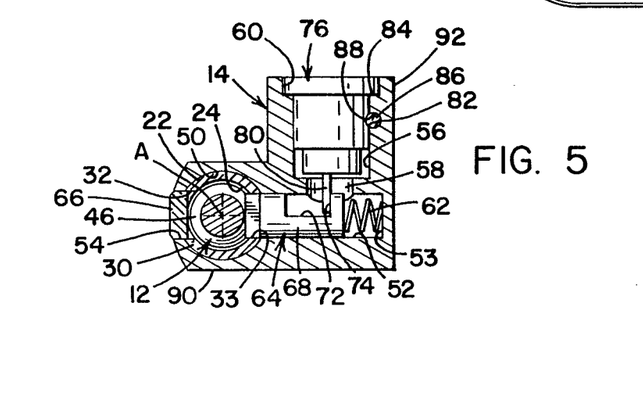
FIG. 5 is an enlarged sectional view taken along line 5—5 of FIG. 4.

The lock housing 14 projects radially from the axis A predominantly in a direction opposed to the rim hooks as shown in FIG. 1 so as not to interfere with or contact the wheel spokes or the horn carried on the wheel. The keyhole 78 opens in a direction facing the seated user for easy access. More particularly in this respect, the lock housing 14 has a planar rear surface 90 facing toward the steering wheel as shown in FIG. 4. The cylinder lock 76 is disposed in a projected portion 92 of the lock housing 14 which extends perpendicularly to the axis A away from the rear surface 90 and the first rim hook 16. No part of the steering wheel lock between the rim hooks 16, 18 extends inwardly of the steering wheel rim R. As further shown with reference to FIG. 9, this provides clearance in front of the steering wheel spokes 94, the hub 96, and the horn 98 for placement of the steering wheel lock and insertion of the user's fingers around and behind the lock as needed for handling.

Figure 7:
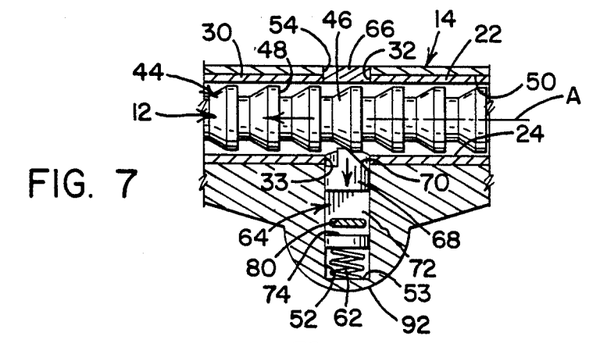
FIG. 7 is a further enlarged partial view of the section shown, in FIG. 6.
Figure 8:
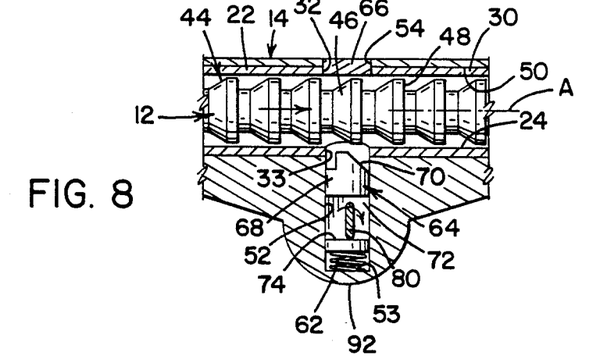
FIG. 8 is a further enlarged partial view of the section shown, in FIG. 7.
Figure 9:
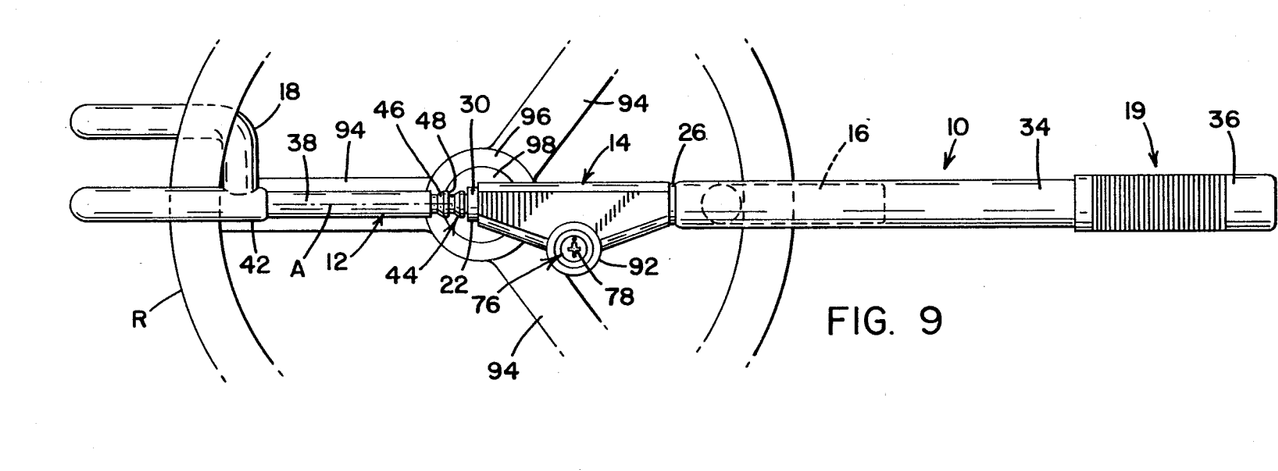
FIG. 9 is a front view of the steering wheel lock of FIG. 1 shown in an alternate position taken when mounted on a steering wheel.

Operation of the locking means 20 is illustrated in FIGS. 6 through 8. As shown in FIG. 6, the coil spring 62 normally biases the ratchet pawl 54 outwardly of the first bore 52 and into engagement with an annular stop surface 48 of a ratchet tooth 44 on the rod member 12. The rod member 12 is thereby constrained from movement axially inward of the tubular member 10. Movement of the rod member 12 axially outward of the tubular member 10 as indicated by the arrows shown in FIG. 7 causes a conical bearing surface 46 of a ratchet tooth 44 to act against the angular end surface 70 of the ratchet pawl 64 whereby the ratchet pawl 64 is moved inwardly of the first bore 52 against the force of the coil spring 62 and out of engagement with the ratchet teeth 44. The coil spring 62 then returns the ratchet pawl 64 back outwardly into engagement with the ratchet teeth 44 to loosely hold the rod member 12 in a next spaced axial position with respect to the tubular member 10 as shown in FIG. 6. Use of the key lock cylinder 76 to rotate the torque blade 80 as shown in FIG. 9 causes the torque blade 80 to act against the torque blade surface 74 whereby the ratchet pawl 64 is withdrawn inwardly of the first bore 52 and out of engagement with the ratchet teeth 44. The locking members remain in the positions shown in FIG. 8 to freely permit movement of the rod member 12 axially into the tubular member 10 until locked by use of the key.

The steering wheel lock is mounted on a steering wheel by first placing the first wheel rim hook 16 over the steering wheel rim as shown in FIG. 1, and then by extending the rod member 12 axially out of the tubular member 10 through the lock housing 14 until the second wheel rim hook 18 is firmly engaged against the steering wheel at a position opposed to that engaged by the first wheel rim hook 16. As shown in FIG. 6, the locking means will loosely retain the rod member 12 and thus the two wheel rim hooks 16 and 18 at any of the axially spaced positions defined by the spacing between the ratchet teeth 44, whereby the rod 12 need not be manually held from sliding back and forth. The plurality of ratchet teeth 44 provide a great number of axial positions for the extended rod so that the steering wheel lock is adjustable over a wide range to accommodate most steering wheel sizes. Most importantly, the locking means will securely retain the rod member and the second rim hook 18 out of the tubular member 10 at the axially spaced position firmly mounted against the steering wheel rim as shown in FIG. 1. The steering wheel lock is thus self-locking into the mounted position and does not require a manual key operation to be locked in place.

The steering wheel lock is removed by unlocking the lock cylinder 76 to permit axial retraction of the second rim hook 18 toward the first rim hook 16 to clear the steering wheel rim. The rod member 12 can advantageously be fully inserted into the tubular member 10 up to the L-shaped member 40 to fully collapse the steering wheel lock for storage. Storage of the steering wheel lock in the locked condition enables the locking means 20 to retain the rod member 12 from uncontrollably sliding out of the tubular member 10 while stored in the vehicle trunk or under the seat, and prepares the steering wheel lock for mounting as described above without use of the key.

Other features and advantages of the present invention are provided by the structural arrangements described above. Enclosure of the locking components within the lock housing 14 with the lock housing 14 mounted on the end of the tubular member 10 secures these components against tampering by a potential thief. Integral construction of the lock housing 14 with the tubular member 10 presents no external pry points in which a criminal tool may be inserted. Enclosure of the ratchet pawl and associated components within the lock housing 14 also protects a user's fingers from pinch points and the like. Furthermore, the double walled tubular construction cannot easily be destructively sawed into.

The invention has been described with reference to the preferred embodiment. It will be appreciated that modifications or alterations which would not deviate from the present invention will occur to others upon their reading and understanding of this specification. It is intended that all such modifications and alterations be included insofar as they come within the scope of the appended claims or the equivalents thereof.

Having thus described the invention, it is claimed:

1. In a vehicular steering wheel mounted lock device of the type which includes a sleeve member aligned along an axis and having first hook means affixed thereto for engaging the rim of said steering wheel from the inside thereof; an elongated rod member telescopically received within said steering wheel and having second hook means affixed thereto oppositely facing said first hook means for engaging the rim of said steering wheel from the inside thereof; one of said members having a portion extending beyond its hook means for causing interference with the interior of said vehicle upon continued rotation of said steering wheel when said device is applied thereto; lock means including a lock housing associated with said sleeve member permitting telescopic movement of said rod member from a collapsed position whereat said rod member is substantially received within said sleeve member to a locked position whereat said rod member is axially displaced from said sleeve such that said hook means contact said rim from the inside thereof, the improvement comprising:

said rod having a plurality of circumscribing ratchet teeth spaced longitudinally about the portion thereof adapted to be telescopically received within said sleeve member, each tooth including a flat annular stop surface perpendicular to said axis and terminating in a longitudinally extending cylindrical surface, a frusto-conical surface extending from the opposite side of said cylindrical surface radially inwardly with its minor diameter portion thereof adjacent said stop surface of an adjacent ratchet tooth, said ratchet teeth oriented such that said frusto-conical surface increases in diameter as said rod member is telescoped out of said sleeve member;

pawl means within said lock housing spring biased into contact with said ratchet teeth surfaces to permit relative rotation between said rod and said sleeve when said rod is drawn out of said sleeve while preventing axial movement of said rod into said sleeve member by contact with said stop surface;

a key lock for disabling said spring bias when said key is actuated to permit said rod to telescopically move in either direction within said sleeve member while permitting said pawl means to be spring biased in an unactuated position whereby said device can be moved to said locked position from said collapsed position without actuating said key lock;

said lock housing has a passageway extending therethrough which is coaxial with said axis and adapted to telescopically receive said rod member, said housing having a first blind bore with a closed end internally within said housing and an open end opening into said passageway, said first blind bore generally perpendicular to said passageway; a cylindrical pawl disposed within said blind bore, said pawl having a spring retaining end, an angularly shaped pawl end and a slot of predetermined width and length intermediate said ends; spring means within said closed end of said blind bore in contact with said spring retaining end to bias said angular end into said passageway; said housing having a second bore intersecting said first bore at a position overlying said slot at one end thereof and with its opposite end opening in the surface of said housing, a lock cylinder in said second bore at its surface open end, a torque blade member within said slot and affixed to said lock cylinder, said torque blade movable by said lock cylinder from an unlocked position having no effect on said spring means to a locked position whereat said spring means is compressed and said angular end is retracted from said passageway;

said sleeve member comprises a cylindrical tube, said tube having diametrically opposed, circular openings formed therein corresponding in size to said first bore, said first bore in said lock housing extending through said passageway and said circular openings to the exterior surface of said lock housing, said passageway in said lock housing receiving said tube, said first bore aligned with said circular openings and a plug extending from the external surface of said lock housing and into one of said circular openings in said tube to pin said lock housing to said tube;

said ratchet tooth having a second cylindrical, longitudinally extending surface with one end contiguous with said minor diameter portion of said frusto conical surface and the other end contiguous with said stop surface and an adjacent tooth; said angular pawl end including a flat radially extending surface adapted to seat in face-to-face relationship with said stop surface;

said lock housing having a bottom portion substantially aligned with the bottom of said sleeve member and said first hook means extending from said bottom of said sleeve member to avoid interference with the hub portion of said steering wheel; and said lock housing having a cylindrical portion diametrically opposed to said plug containing said lock cylinder whereby the dimensional size of said lock housing perpendicular to said axis is minimized to avoid interference with the steering wheel while maintaining ease of assembly.

2. A vehicular locking device for mounting solely to the steering wheel of a vehicle comprising:

a sleeve member elongated along an axis and having first hook means affixed thereto for engaging the rim of said steering wheel from the inside thereof;

an elongated rod member telescopically receivable in said sleeve member and having second hook means affixed thereto oppositely facing said first hook means for engaging the rim of said steering wheel from the inside thereof;

one of said members having a portion extending beyond its hook means for causing interference with the interior of said vehicle upon continued rotation of said steering wheel when the device is applied thereto;

lock means associated with said sleeve member to permit telescopic movement of said rod member out of said sleeve without the use of a key and telescopic movement of said rod member into said sleeve member only with the use of a key so that said device can be actuated from a telescopically collapsed position to a telescopically extended, locked position without having to use any key to actuate said lock means;

said lock means including a lock housing applied to one end of said shaft member and having a passageway extending therethrough which is coaxial with said axis and adapted to telescopically receive said rod member, said housing having a first blind bore with a closed end internally within said housing and an open end opening into said passageway, said first blind bore generally perpendicular to said passageway; a cylindrical pawl disposed within said blind bore, said pawl having a spring retaining end, an angularly shaped pawl end, and a slot of predetermined length and width intermediate its ends; spring means within said closed end of said blind bore biasing said angular end of said pawl into said passageway; said housing having a second bore with one end intersecting said first bore at a position overlying said slot and with its opposite end opening to the surface of said housing; a lock cylinder in said second bore at said opposite end; a torque blade member within said slot and affixed to said lock cylinder, said torque blade rotatable by said lock cylinder from said applied, locked position permitting said pawl to be biased into said passageway to an unlocked position retracting said pawl from said passageway; and said rod member having a series of longitudinally spaced ratchet teeth adjacent one another, each ratchet tooth including an annular stop surface extending perpendicular to said axis and terminating in a longitudinally extending first cylindrical surface, a frusto-conical surface extending from the opposite side of said first cylindrical surface radially inwardly with its minor diameter portion thereof adjacent said stop surface of an adjacent ratchet tooth, said ratchet surfaces oriented such that said pawl contact said stop surface to prevent movement of said rod into said sleeve while said frusto-conical surfaces move said pawl against said spring bias when said rod is telescopically moved out of said sleeve whereby said first and second hook means can swivel relative to one another while said device is attached to said steering wheel to permit said device to be easily applied to a variety of steering wheel configurations.

3. The device of claim 2 wherein said sleeve member comprises a cylindrical tube, said tube having diametrically opposed, circular openings formed therein corresponding in size to said first bore, said first bore in said lock housing extending through said passageway and said circular openings to the exterior surface of said lock housing, said passageway in said lock housing receiving said tube, said first bore aligned with said circular openings and a plug extending from the external surface of said lock housing and into one of said circular openings in said tube to pin said lock housing to said tube;

said ratchet tooth having a second cylindrical, longitudinally extending surface with one end contiguous with said minor diameter portion of said frusto conical surface and the other end contiguous with said stop surface and an adjacent tooth; said angular pawl end including a flat radially extending surface adapted to seat in face-to-face relationship with said stop surface;

said lock housing having a bottom portion substantially aligned with the bottom of said sleeve member and said first hook means extending from said bottom of said sleeve member to avoid interference with the hub portion of said steering wheel; and said lock housing having a cylindrical portion diametrically opposed to said plug containing said lock cylinder whereby the dimensional size of said lock housing perpendicular to said axis is minimized to avoid interference with the steering wheel while maintaining ease of assembly.

4. An anti-theft device for attachment to a steering wheel of an automobile comprising:

an elongated tubular member having an outer end and an elongated passageway extending along its axis therethrough, said tubular member having a first U-shaped hook portion extending therefrom, said U-shaped hook portion of said tubular member adapted to engage said wheel from the inside thereof with said outer end of said tubular member extending a substantial distance beyond the periphery of said wheel;

a rod member having an elongated rod adapted to extend in a telescopic manner within said passageway of said tubular member and a second U-shaped hook secured to one end of the rod having an opening facing opposite to the first hook and adapted to engage said wheel from the inside thereof;

a plurality of spaced annular grooves circumferentially formed in said rod, each of which includes a vertical side wall and a frusto conical side wall sloping from said vertical side wall towards side second hook;

a housing means firmly formed around an end portion of the tubular member with said elongated passageway of the tubular member extending therethrough;

a lock having a locking member extending downwardly;

means offset with respect to the axis of the tubular member in the housing means for firmly receiving the lock;

a transverse passageway transversely formed in the housing means and interconnecting said elongated passageway in said tubular member;

rod-like bearing means slidably accommodated in the transverse passageway under the lock and having a pawl attached to an end thereof and arranged to be actuated between a locking position with the pawl protruding into an annular groove in the rod whereat contact is made with said vertical side wall and an unlocking position with the pawl withdrawn from said annular groove, said rod-like bearing means further including a recess to receive said locking member and control the position of the pawl in a locking or unlocking position; and a spring member disposed in the transverse passageway and biasing said rod-like bearing means towards the passageway in the tubular member.

* * * * *